United States Patent
Rodriguez et al.

(10) Patent No.: US 9,131,035 B2
(45) Date of Patent: *Sep. 8, 2015

(54) MOBILE DEVICES AND METHODS EMPLOYING HAPTICS

(71) Applicant: Digimarc Corporation, Beaverton, OR (US)

(72) Inventors: Tony F. Rodriguez, Portland, OR (US); William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,128

(22) Filed: Aug. 5, 2014

(65) Prior Publication Data
US 2015/0080060 A1   Mar. 19, 2015

Related U.S. Application Data

(63) Continuation of application No. 13/174,301, filed on Jun. 30, 2011, now Pat. No. 8,798,534.

(60) Provisional application No. 61/363,143, filed on Jul. 9, 2010.

(51) Int. Cl.
*H04B 5/02* (2006.01)
*H04M 3/02* (2006.01)
(Continued)

(52) U.S. Cl.
CPC ............... *H04M 3/02* (2013.01); *G06F 3/016* (2013.01); *H04M 1/725* (2013.01);
(Continued)

(58) Field of Classification Search
CPC ........... H04W 88/02; H04B 5/00; H04B 5/02; H04M 1/7253

USPC ............ 455/41.1, 41.2, 410, 414.1, 411, 566; 345/173, 156, 418, 419; 340/407.2
See application file for complete search history.

(56) References Cited

U.S. PATENT DOCUMENTS 6,161,126 A    12/2000   Wies et al.
6,715,045 B2    3/2004   Braun et al.
(Continued)

OTHER PUBLICATIONS

PCT International Search Report and Written Opinion application PCT/US11/43394, mailed Nov. 16, 2011.
(Continued)

*Primary Examiner* — Minh D Dao
(74) *Attorney, Agent, or Firm* — Digimarc Corporation

(57) ABSTRACT

A variety of haptic improvements useful in mobile devices are detailed. In one, a smartphone captures image data from a physical object, and discerns an object identifier from the imagery (e.g., using watermark, barcode, or fingerprint techniques). This identifier is sent to a remote data structure, which returns data defining a distinct haptic signature associated with that object. This smartphone then renders this haptic signal to the user. (Related embodiments identify the object using other means, such as location, or NFC chip.) In another arrangement, haptic feedback signals social network information about a product or place (e.g., the user's social network friends "Like" a particular brand of beverage). In yet another arrangement, the experience of watching a movie on a television screen is augmented by tactile effects issued by a tablet computer on the viewer's lap. In still another arrangement, commercial vendors bid for rights to employ different ones of a library of haptic signals on one or more users' smartphones, e.g., to alert such user(s) to their products/services. A great variety of other features and arrangements are also detailed.

25 Claims, 2 Drawing Sheets

(51) Int. Cl.
*H04N 21/44* (2011.01)
*H04N 21/4788* (2011.01)
*H04N 21/658* (2011.01)
*H04N 21/81* (2011.01)
*H04N 21/8352* (2011.01)
*H04N 21/8358* (2011.01)
*H04N 21/84* (2011.01)
*G06F 3/01* (2006.01)
*H04M 1/725* (2006.01)

(52) U.S. Cl.
CPC .... *H04N 21/44008* (2013.01); *H04N 21/4788* (2013.01); *H04N 21/6582* (2013.01); *H04N 21/812* (2013.01); *H04N 21/8352* (2013.01); *H04N 21/8358* (2013.01); *H04N 21/84* (2013.01)

(56) References Cited

U.S. PATENT DOCUMENTS

| | | | |
|---|---|---|---|
| 7,225,115 B2 | 5/2007 | Jones | |
| 7,283,120 B2* | 10/2007 | Grant | 345/156 |
| 7,437,397 B1* | 10/2008 | Koudas et al. | 708/422 |
| 7,555,691 B2* | 6/2009 | Gilbert et al. | 714/746 |
| 7,779,166 B2 | 8/2010 | Grant et al. | |
| 7,856,248 B1* | 12/2010 | Fujisaki | 455/556.1 |
| 8,093,995 B2 | 1/2012 | Steger et al. | |
| 8,116,724 B2* | 2/2012 | Peabody | 455/404.2 |
| 8,123,660 B2 | 2/2012 | Kruse et al. | |
| 8,319,620 B2* | 11/2012 | Usher et al. | 340/438 |
| 8,378,979 B2* | 2/2013 | Frid et al. | 345/173 |
| 8,429,173 B1 | 4/2013 | Rosenberg et al. | |
| 8,798,534 B2* | 8/2014 | Rodriguez et al. | 455/41.1 |
| 2002/0019216 A1* | 2/2002 | Horiguchi | 455/90 |
| 2002/0177935 A1* | 11/2002 | Winner et al. | 701/93 |
| 2004/0153244 A1* | 8/2004 | Kellum | 701/301 |
| 2005/0156892 A1* | 7/2005 | Grant | 345/167 |
| 2006/0038781 A1 | 2/2006 | Levin | |
| 2006/0066569 A1* | 3/2006 | Eid et al. | 345/156 |
| 2006/0218031 A1 | 9/2006 | Weinberg et al. | |
| 2007/0106457 A1 | 5/2007 | Rosenberg | |
| 2008/0058894 A1 | 3/2008 | Dewhurst | |
| 2008/0120029 A1 | 5/2008 | Zelek et al. | |
| 2008/0287147 A1 | 11/2008 | Grant et al. | |
| 2009/0251421 A1 | 10/2009 | Bloebaum | |
| 2009/0259359 A1 | 10/2009 | Whitton et al. | |
| 2009/0270045 A1 | 10/2009 | Flaherty | |
| 2009/0325647 A1 | 12/2009 | Cho et al. | |
| 2010/0033313 A1* | 2/2010 | Keady et al. | 340/438 |
| 2010/0045619 A1* | 2/2010 | Birnbaum et al. | 345/173 |
| 2010/0048242 A1 | 2/2010 | Rhoads et al. | |
| 2010/0152545 A1 | 6/2010 | Ramsay et al. | |
| 2010/0188327 A1* | 7/2010 | Frid et al. | 345/156 |
| 2010/0198458 A1 | 8/2010 | Buttolo et al. | |
| 2012/0050685 A1* | 3/2012 | Bartlett et al. | 351/223 |

OTHER PUBLICATIONS

PCT Int'l Preliminary Report on Patentability, PCT/US11/43394 (published as WO2012015579), mailed Jan. 24, 2013.

Karuei, Idin, et al. "Vibration Perception in Mobile Contexts." Ottawa, Ontario, Canada May 31 to Jun. 2: 28 (2010).

Adcock, Augmented Reality Haptics—Using ARToolKit for Display of Haptic Applications, IEEE Augmented Reality Toolkit Workshop, 2003.

Al Osman, Evaluating ALPHAN—A Communication Protocol for Haptic Interaction, Proc. 2008 IEEE Symp. on Haptic Interfaces for Virtual Environment and Teleoperator Systems.

Henrysson, AR Tennis, 2006 SIGGRAPH-ART.

Kulyukin, Eyes-Free Barcode Localization and Decoding for Visually Impaired Mobile Phone Users, IPCV 2010, 7 pp. (downloaded Jun. 29, 2010).

Lee, Tactile Visualization with Mobile AR on a Handheld Device, LNCS 4813, pp. 11-21, 2007.

Luk et al, A Role for Haptics in Mobile Interaction—Initial Design Using a Handheld Tactile Display Prototype, ACM CHI '06, Apr. 22, 2006, 10 pp.

Rohs, et al, Map Navigation with Mobile Devices: Virtual Versus Physical Movement With and Without Visual Context, Proc. 9th Int'l Conf on Multimodal Interfaces, ACM, 2007.

Tan, et al, Information Transmission with a Multifinger Tactual Display, Perception & Psychophysics 61.6, 1999, pp. 993-1008.

Zelek, Seeing by Touch (Haptics) for Wayfinding, International Congress Series 1282 (2005), pp. 1108-1112.

Baumann et al, Emulating Human Attention-Getting Practices with Wearable Haptics, IEEE Haptics Symposium, Mar. 2010.

Gandy, et al, Universal Design—Lessons for Wearable Computing, IEEE Pervasive Computing, vol. 2, No. 3, 2003, pp. 19-23.

Lindeman, et al, The Design and Deployment of a Wearable Vibrotactile Feedback System, 8th Int'l IEEE Symposium on Wearable Computers, 2004, pp. 56-59.

McDaniel, et al, A Visio-Haptic Wearable System for Assisting Individuals Who Are Blind, ACM SIGACCESS, Accessibility and Computing, 2006, pp. 12-15.

* cited by examiner

FIG. 1B
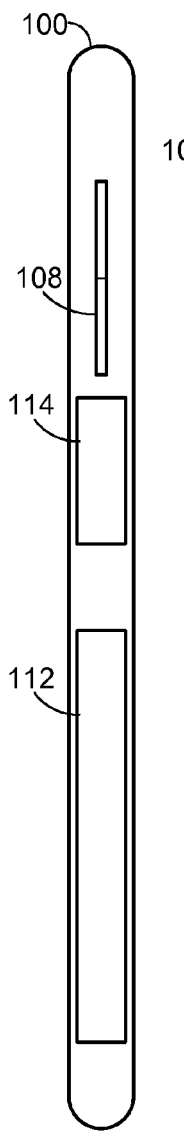
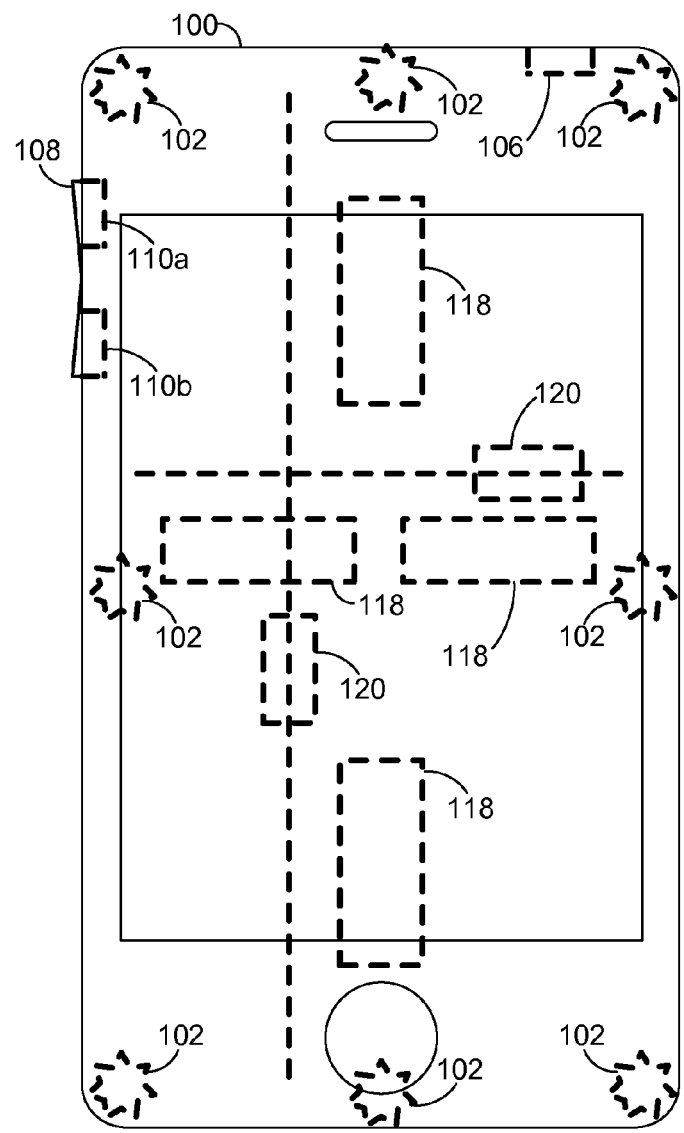
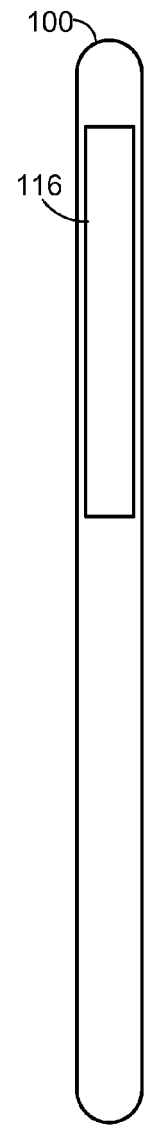
FIG. 1C      FIG. 1A      FIG. 1D

MOBILE DEVICES AND METHODS EMPLOYING HAPTICS

RELATED APPLICATION DATA

This application is a continuation of U.S. application Ser. No. 13/174,301, filed Jun. 30, 2011, which claims priority from provisional application 61/363,143, filed Jul. 9, 2010.

TECHNICAL FIELD

Most embodiments of the present technology concern use of haptic actuators, such as in smartphone devices.

INTRODUCTION AND SUMMARY

Haptics devices (sometimes termed "force feedback" devices) are becoming more widespread, but their popularity is limited because relatively few systems make use of the technology, and then often for only limited purposes.

The prototypical example is mobile phones. Such devices routinely have haptic devices, but their use is almost exclusively as "silent ringers"—signaling incoming calls and messages.

Some popular software applications—primarily games—provide support for haptic devices. Road racing games, for instance, often apply force-feedback to the joystick, steering wheel or other game controller when the user drives off the road. The force and frequency of the effects can depend on various contextual factors, such as speed and terrain. In such applications, however, the software writers must "author" the haptics special effects, so that they arise in the desired scenarios with the desired parameters (much like authoring the audio accompaniment to a game). The need to "author" haptics effects is an impediment to haptics' wider use.

There are certain applications in which the need for haptics authoring is diminished, or absent. One is where a haptic actuator simply outputs a touch or force earlier sensed by a haptic sensor. A common example is haptic tele-manipulation in robot systems. A haptic sensor on the robot detects a touch or pressure, and this effect is relayed to an operator at a remote location and applied using a haptic actuator.

More elaborate are vision substitution systems, e.g., to aid the blind in navigating the visual world. In such arrangements a camera typically captures a view of a user's environment, and this image information is mapped in some fashion to produce corresponding tactile output. One such system is shown in patent application 20080058894. Another is detailed in Zelek, Seeing by Touch (Haptics) for Wayfinding, International Congress Series 1282 (2005), pp. 1108-1112.

Some vision substitution arrangements are purpose-built to respond to certain patterns. One, for example, recognizes a variety of traffic signs, and provides haptic output. (Lee, Tactile Visualization with Mobile AR on a Handheld Device, LNCS 4813, pp. 11-21, 2007.) Another aids the visually impaired in locating and decoding barcodes in supermarkets (Kulyukin, Eyes-Free Barcode Localization and Decoding for Visually Impaired Mobile Phone Users, ICIP Computer Vision and Pattern Recognition 2010). In the barcode system, the reader device (a mobile phone) vibrates to signal the user to move the phone device up, down, left, right, or tilt, so as to properly orient the device relative to the barcode.

Recognition of known patterns is sometimes used in haptic-equipped games. An example is shown in Henrysson, AR Tennis (SIGGRAPH-ART, 2006). In this arrangement, two mobile-phone equipped players sit opposite each other, with a printed ARToolKit marker placed on a table between them. The phones respond to the marker by presenting an augmented reality view of a tennis court, from a perspective dependent on the phone's orientation to the marker. The players move their phones to hit a virtual ball across the net on the displayed court. Each time the ball is successfully hit, the phone vibrates.

Other haptic arrangements based on recognition of the ARToolKit markers are detailed in Adcock, Augmented Reality Haptics—Using ARToolkit for Display of Haptic Applications, IEEE Augmented Reality Toolkit Workshop, 2003.

A mobile phone application that interacts with printed maps is shown in Rohs et al, Map Navigation with Mobile Devices—Virtual Versus Physical Movement With and Without Visual Context, Proc. 9th Int. Conf. on Multimodal Interfaces, 2007. In this system, the phone analyzes map imagery captured by the phone's camera for a parking lot symbol ("P"), and vibrates to alert the user when such symbol appears in the camera's field of view.

Just as there are haptic-based systems that are responsive to imagery, there are also haptic-based systems that respond to audio. One is the Tactuator, which maps phonic sounds to vibration patterns that are applied to three fingers at different rates and amplitudes. (Tan et al, Information Transmission with a Multi-Finger Tactual Display, Perception and Psychophysics, Vol. 61, No. 6, pp. 993-1008, 1999.)

Haptics are closely related to tactile technologies. Except as otherwise noted (such as by terms such as "exclusively haptic"), references to haptic technology and devices should be understood to include tactile technology and devices, and vice versa.

A leader in haptic technology is Immersion Corporation, of San Jose, Calif. Immersion's large portfolio of published patents and applications serves as a wide-ranging tutorial to the field. Examples include U.S. Pat. Nos. 5,691,898, 5,734, 373, 2001043847, 2002033802, 2002072814, 2002109708, 20080294984, 20090085882, 20090305744, 20100013653, 20100073304, 20100141407, 20100149111, 20100160041, and references cited therein.

Tactic actuators in consumer devices were originally limited to vibratory electric motors using an offset mass. Increasingly sophisticated actuators are becoming more widely available, including those based on electroactive polymers, piezoelectrics, acoustic radiation pressure, and electrostatic surface actuation. As the technology evolves, 3D haptic effects that were normally only found in sophisticated or experimental systems will increasingly be found in consumer devices, e.g., allowing the haptic simulation of textured surfaces, recoil, momentum, physical presence of objects, etc.

One such example is detailed in Luk et al, A Role for Haptics in Mobile Interaction: Initial Design Using a Handheld Tactile Display Prototype, CHI '06. This system uses a multi-element piezoelectric tactile actuator ("display") to effect lateral skin stretching. (In particular, eight piezoelectric benders are stacked together and separated by small brass rods. By inducing bending motion to the piezo actuators, local regions of compression and stretch are generated across the user's skin. The sensation can be controlled in terms of stimulus waveform, amplitude, speed and duration.) Such actuator can, e.g., simulate the feel of riffling across the teeth of a comb. The actuator can present different patterns of stimuli to the user ("haptic icons" or "tactons"), each of which can be associated, e.g., with a different item in a list menu. The actuator can be mounted on the side of a mobile phone, on a slider input device against which the user's thumb rests. By this arrangement, the user's thumb can serve both to receive haptic output, and to provide associated motion or pressure input.

While much work has been done in haptics technology, much remains to be done. In accordance with its different aspects, the present technology provides features and arrangements not previously contemplated, and provides benefits not previously available.

A method according to one aspect of the present technology includes using a mobile device to capture image data representing a physical object. This data is then processed (e.g., by the mobile device, and/or by a remote system) so as to obtain metadata that corresponds to the object. This metadata is transmitted to a remote system. In response, data is received indicating a haptic signature that is associated with the object. This haptic signature is presented to a user of the mobile device, e.g., through one or more onboard or linked haptic actuators.

The metadata can indicate one of plural classes to which the physical object belongs. If it belongs to a first class, one haptic signature can be rendered; if it belongs to a second class, a different haptic signature can be rendered. These signatures can differ in one or more of, e.g., waveform, amplitude, frequency, and duration. The classes can be classes such as a class of persons, a class of books, a class of DVDs, a class of barcodes, a class of printed text, a class of landmarks such as buildings, a class of logos, a class of works of art, and a class of product containers. Or each class can comprise a unique physical object.

An exemplary physical object is a beverage container. The container may bear a trademark (e.g., Minute Maid) owned by a trademark proprietor (e.g., the Coca Cola Company). The haptic signature that is presented in response to sensing such object may be defined by the trademark proprietor, e.g., as part of its branding efforts. Thus, just as each trademarked product may have a distinctive visible "look," it may similarly have a distinctive haptic "feel."

In a related arrangement, a product is identified not by reference to its visual appearance (e.g., from image data), but by an identifier emitted by an RFID (aka "near field communication") chip. The RFID identifier is sent to a remote system. In response, the phone obtains haptic signature data associated with that identifier/product.

A method according to another aspect of the present technology involves a mobile device that is executing a "visual search" or "mobile discovery" application (e.g., the Google Goggles application, or the Nokia Point & Find application). The mobile device receives input, such as location data, which is used to determine—at least in part—a first class of visual stimulus (among plural different classes, such as barcodes, text, books, DVDs, landmarks, logos, works of art, product containers, etc.) to which the visual search application should respond. (E.g., if in a supermarket location, the device may respond to barcode stimulus.) Then, when imagery captured by the mobile device includes visual stimulus of that first class, a corresponding type of haptic signal is output to the user. The system is thus automatically attuned to different classes of objects, based on its location (or other input).

A method according to a further aspect of the present technology includes sensing a user's first gesture made with a mobile phone device. If the first gesture complies with a first condition, first haptic feedback is provided to the user. A further gesture by the user is then sensed. If this further gesture complies with a second condition, a further response is provided to the user. (The gestures can be discerned by analyzing frames of imagery to discern motion of the mobile phone device. Alternatively, data from the phone's motion and position sensing devices, e.g., accelerometers, gyroscopes, and magnetometers, can be examined to discern gestures.)

A method according to yet another aspect of the present technology involves moving a camera-equipped phone in a plane roughly parallel to a printed object (e.g., within +/−30 degrees of the plane of the printed object). While the phone is moving, it captures imagery from the object. This imagery enters the camera's field of view from a first direction (e.g., right side, top, etc.). This imagery is analyzed for one or more features. Upon detection of the feature(s), at least one of plural haptic transducers in the phone are activated, in such manner as to provide haptic feedback associated with the first direction.

In one particular such implementation, the printed object is a printed map, and the feature is an indicia representing a topographic feature in the terrain represented by the map (e.g., an indicia representing a river, or a cliff). Different haptic feedback can be output depending on indicia sensed from the captured imagery. If the indicia signals a geographic feature impassable by a hiker (e.g., a river or a cliff), then a corresponding haptic feedback can be provided to the user. In some arrangements, the indicia can provide steganographic markings—such as digital watermark data.

In accordance with another aspect of the present technology, a camera-equipped mobile phone captures imagery from packaging for a consumer product (e.g., a cereal box). This imagery is analyzed to discern a feature. By reference to this feature, the phone presents, on its screen, an augmented reality overlay. The user operates the phone to provide input (e.g., tilting), to thereby navigate along a path in the augmented reality overlay. During the course of the navigation, one or more of plural haptic transducers in the phone are activated to provide directional feedback relating to the navigated path.

Another aspect of the present technology is a method in which a sensor-equipped mobile phone captures information (e.g., audio or visual stimulus, RFID information, or location information) at a first location. Through use of this captured information, the phone presents navigation information to a user to guide the user to a second, different, location. This navigation information can include haptic signals, e.g., with different haptic actuators activated at different times to help direct the user.

In one such embodiment, the user is interested in an item of clothing worn by a manikin in a department store window. The user captures an image of the clothing. This imagery is analyzed to recognize the clothing, and a server computer provides data indicating the location where that item is available in the store. Information is then presented to the user, through the mobile phone, guiding the user to the location where the clothing is displayed—facilitating its purchase.

Instead of identifying the displayed item by captured imagery, an identifier emitted by an RFID chip associated with the displayed item can be sensed. Then, as before, a server computer can indicate the location of that item within the store, and the user can be guided to it.

Alternatively, instead of capturing information from the displayed product itself, the user's cell phone may sample ambient audio at the user's location in front of the display window. The ambient audio may have a low level signal (e.g., a steganographic digital watermark) that can be correlated with the user's location (see, e.g., Nielsen's patent publication US20100134278). Knowing the user's location, a system can identify the item of clothing displayed nearby and guide the user to it, as before.

Likewise, instead of capturing imagery or audio, the mobile phone can simply note its location (e.g., by GPS) when the user signals interest in an item displayed nearby (such as by activating a feature on a touch screen UI, or by a gesture). The phone may additionally note the direction the user is apparently facing when interest is signaled, reasoning the screen is facing the user, and the user is facing the item. This positional information is correlated with a product displayed nearby. Again, with knowledge of the product of apparent interest, information is again presented to guide the user to the location in the store where that item is stocked.

As the user walks to the product, the mobile phone may sense other information along the way—indicating the user's current position. As before, this other information may be of various types. For example, the phone may recognize product on nearby shelves (such as by imagery, audio, or RFID tags associated with products), and determine from such information the user's progress in navigating to the item. Or audio signals can be analyzed to provide information about the user's location. If appropriate, the original guidance can be revised to account for the user straying from the originally-contemplated path.

In accordance with yet another aspect of the present technology, a sensor in a mobile phone senses data from a pharmaceutical or food product, or from packaging for such product. A data store is checked for information relating to adverse reactions by one or more persons (e.g., the user and family members) to pharmaceutical or food products (e.g., a peanut allergy). The phone then issues a warning signal (e.g., haptically) if the sensed data indicates that the product or packaging is associated with an adverse reaction for such person(s).

In checking for adverse reactions, the method can include consulting stored medical record data for the person(s), e.g., identifying prescribed medications for that person, or identifying products that interact adversely with prescribed medications.

In accordance with yet another aspect of the present technology, a portable apparatus is adapted for being conveyed by a juvenile. The apparatus includes a haptic actuator and a sensor. The sensor is responsive to an emitter worn by a parolee or a registered offender (e.g., an RFID chip in an ankle bracelet worn by sex offender). The haptic actuator issues a silent warning to the juvenile if the sensor senses such a person.

A method according to still a further aspect of the present technology involves a system that accepts, from a first party, a message for delivery to a second party. However, the system is adapted to accept the message only when the first party is within a defined physical region (e.g., in a commercial establishment such as a bar or coffee shop, or within a bounded area defined by reference to geocoordinates). The system transmits the message to a second party, but again, only when the second party is within that defined physical region. The system may trigger presentation of a haptic signal to the first party to indicate transmission of the message to the second party.

Among the many other aspects of the present technology are systems for practicing the foregoing methods, methods of using the foregoing systems, and computer readable storage media containing non-transitory software instructions for configuring programmable hardware processing systems to perform one or more of the acts associated with such methods.

The foregoing and additional features and advantages of the present technology will be further apparent from the detailed description, which proceeds with reference to the accompanying drawings.

BRIEF DESCRIPTION OF THE DRAWINGS

FIG. 1A shows a front plan view of a mobile phone equipped with plural haptic actuators, according to one particular embodiment of the present technology.

FIG. 1B is a top view of the mobile phone of FIG. 1A.

FIGS. 1C and 1D are left and right side views of the mobile phone of FIG. 1A.

DETAILED DESCRIPTION

Figure 2:
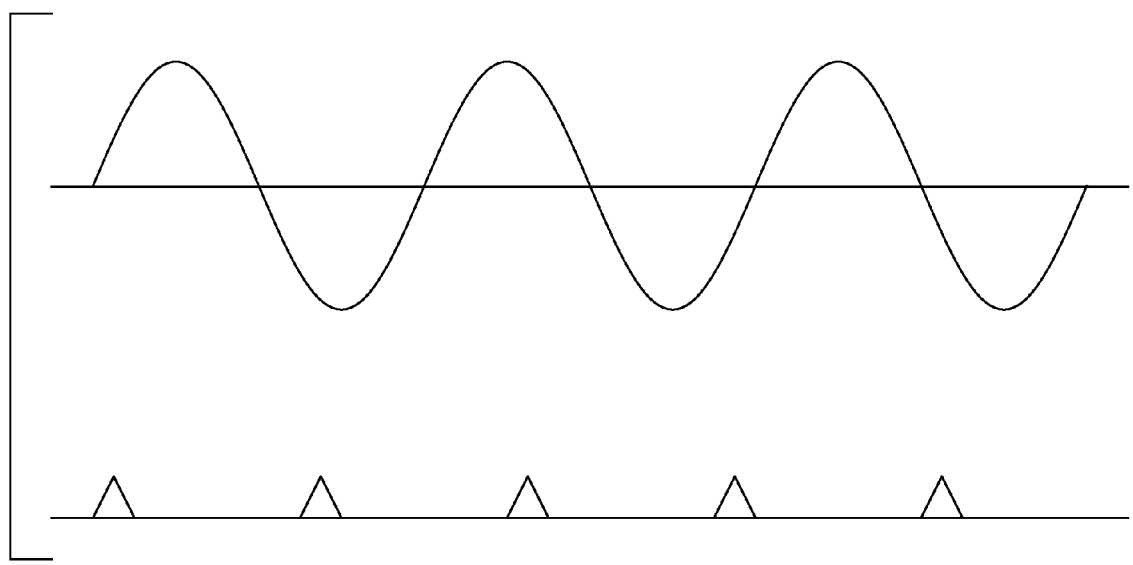
FIG. 2 shows how signals controlling different actuators can be of different waveforms, amplitudes and frequencies.

One aspect of the present technology concerns a mobile device, e.g., an iPhone or Nokia phone, which recognizes a physical object in its environment, and identifies and renders a particular haptic signature corresponding to that object.

Recognition can be performed by known techniques, including visual search technology. Nokia's Point & Find application is illustrative. Such technology can distinguish, for example, two different books, or two different cans of soda, by reference to their visual appearance.

Nokia's technology employs a concept of "Worlds," which generally correspond to the class of objects or activities in which the user is interested. One "world" is "Shopping." Another is "Movies." Others include "City Guide," and "2D Barcode," etc. Users can define other worlds to suit their preferences.

The user may be interested in books, and set the phone to a "Book" world. If a book is recognized within the phone's field of view, the phone gives a distinctive pattern of haptic feedback. This signals to the user that the camera sees the kind of object that the user is looking for. (Conversely, the absence of haptic feedback, or haptic feedback of a different pattern, signals that that camera is looking at something different.)

A related arrangement serves as a currency/coinage reader for the visually impaired. A US $20 banknote can be visually distinguished from a US $5 banknote (and a dime can similarly be visually distinguished from a penny). A mobile phone operating in a mode attuned to such items can provide money-signifying feedback when such an object comes into the field of view. Moreover, the feedback can be different, depending on denomination.

(The Nokia Point & Find visual search application is understood to use, e.g., technology detailed in patent documents US20070106721, US20080267504, US20080270378, US20090083237, US20090083275, and US20090094289. The Google Goggles visual search application is understood to use, e.g., technology detailed in patent documents U.S. Pat. No. 7,751,805, U.S. Pat. No. 7,565,139, US20050185060, US20080002914, US20090279794 and US20090319388. The assignee's own work in this field includes patent application Ser. No. 12/797,503, filed Jun. 9, 2010, and published international patent application WO2010022185.)

Techniques other than visual search can be used to identify objects. One of many other alternative identification techniques relies on RFID chips. These are generally (but not exclusively) unpowered devices, powered by an interrogation signal and responding with an RF signal conveying a multi-bit identifier. (A variety of ISO/IEC standard for RFIDs have been promulgated, including 14443, 15693 and 18000.) Increasingly, phones include so-called "near field communication" technology, which serves to interrogate such chips, and take action based on the received data.

Once identification data has been obtained for a nearby object, the phone can determine what haptic signature to render. In the case of common, or commonly-encountered, objects, such signature data may be stored in the phone's memory. Often, however, the phone will need to consult a physically remote data store to obtain haptic signature data corresponding to particular identification data (or identified object). Once the data has been obtained in such manner, it can be stored in cache memory in the phone in case it soon becomes relevant again.

If an application identifies a can of Coke, the phone may obtain haptic signature data for that object from the Coke web site. Company websites can have a standardized file, like robot.txt, containing haptic signatures for physical objects/products that the company markets. For example, the Coca Cola company web site www.coca-cola<dot>com can include a file, at a known address and with a known name (e.g., www.coca-cola<dot>com\haptic.dat) containing haptic signature data for each of its products (e.g., Coke, Diet Coke, Coca Cola Black Cherry, Coca Cola with Lime, Diet cherry Coke Fresca, Sprite, Dasani, Minute Maid, Odwalla, etc.). The file can be organized in XML fashion, with tags for product names, and tags for haptic signatures. In some cases, such file may not include the haptic signature data literally, but may provide a pointer to another web-accessible address from which such data can be downloaded. Each object's haptic signature may be provided in different formats, adapted to the rendering capabilities of different devices or their respective haptic actuator systems. Thus, partial contents of such a file may have the following form:

```
<Device>iPhone3GS</Device>
    <Object>Coke</Object>
        <Signature>(object-device dependent data)</Signature>
    <Object>Diet Coke</Object>
        <Signature>(object-device dependent data)</Signature>
    <Object>Sprite</Object>
        <Signature>(object-device dependent data)</Signature>
    ...
<Device>iPhone4</Device>
    <Object>Coke</Object>
        <Signature>(object-device dependent data)</Signature>
    <Object>Diet Coke</Object>
        <Signature>(object-device dependent data)</Signature>
    <Object>Sprite</Object>
        <Signature>(object-device dependent data)</Signature>
    ...
```

While this example is simplified for purposes of illustration, more elaborate XML schemes are suitable for use with the present technology. See, e.g., Zhou et al, XML-Based Representation of Haptic Information, IEEE Int. Workshop on Haptic Audio Visual Environments, 2005; and El-Far, Haptic Applications Meta-Language, $10^{th}$ IEEE Int. Symp. on Distributed Simulation, 2004; and Al-Osman, Evaluating ALPHAN: A Communication Protocol for Haptic Interaction, Proc. 2008 IEEE Symp. on Haptic Interfaces for Virtual Environment and Teleoperator Systems. (The latter paper also addresses communication protocols for haptic data.)

As standardized object-associated haptic signatures become more widespread, centralized registries may arise, e.g., servers that store signature data for a variety of different objects. This data may be replicated and locally cached at sites across the internet, just as DNS tables are distributed widely.

In accordance with other aspects of the present technology, haptic actuators are used to provide feedback for user navigation of 3D space.

An illustrative application makes use of a printed object having different regions encoded with different digital watermarks. One such arrangement is detailed in pending application Ser. No. 12/774,512, filed May 5, 2010. In order to access protected information (e.g., a list of passwords), the user may be required to manipulate a phone, relative to the object, in a prescribed sequence of motions. If the sequence is entered correctly, the sequence may serve as a cryptographic key that allows access to the protected information.

The regions may be arrayed like a range of notes on a piano keyboard, and may be visibly marked. The sequence may be defined by a particular ordering of these notes. To enter the sequence, the user must position the phone, in turn, over each note, and tip or tap the phone in such position. The user then moves to the next position in the sequence and repeats.

After each correctly-entered tap (or after a series of correctly-entered taps), the phone may issue haptic feedback, e.g., confirming correct entry of that portion of the sequence.

A related arrangement makes use of an ordinary business card or other talisman. The mobile phone application images the card, and confirms that it matches an expected appearance. Then the user must manipulate the phone in a sequence of motions relative to the card, e.g., towards/away/left/right. Again, haptic feedback can be provided to signal progress in correct entry of the spatial combination.

Although not presently a familiar operation, such spatial actions may soon become rote—at least for commonly-performed functions, as muscle memory develops for those sequences (much as the pattern of touch-tone buttons to operate to dial a familiar phone number often becomes rote—at least in the absence of stored speed dialing).

(In some respects, the foregoing builds on gestural technology introduced in U.S. Pat. No. 6,947,571.)

Certain embodiments of the present technology make use of mobile devices employing plural haptic actuators. FIGS. 1A-1D show an illustrative mobile phone 100 of this sort.

In the depicted arrangement, there are plural vibratory actuators 102 internal to the phone, disposed at the four corners, and at mid-points of the sides. These may be oriented to provide a linear vibratory motion in a left-right direction, in an up-down direction, or in an in-out direction (i.e., away from and towards the front face of the phone). Or the actuators 102 may be of a plural-axis variety, configured so that they can move in two or more orthogonal planes, responsive to appropriate control signals. Of course, eccentric weight rotary actuators can also be used, again oriented in any of the three cited planes.

External button 104 on the top of the phone is coupled to a haptic actuator 106. External rocker button 108 on the left side of the phone is coupled to two internal haptic actuators, 110a and 110b. Through such arrangements, haptic stimulation can be output to a user while the user's fingers are resting on, or providing input through, such buttons.

On the left side of the phone 100 is a large piezo-electric haptic actuator 112 against which the user's fingers may rest, together with a similar but smaller actuator 114. On the right side of the phone is another such actuator 116. These may be multi-element actuators that effect skin stretching and compression, as detailed in Hayward, Tactile Display Device Using Distributed Lateral Skin Stretch, Proc. IEEE Haptic Interfaces for Virtual Environment and Teleoperator Sys. Symp., 2000, p. 1309-1314, and in U.S. Pat. Nos. 6,445,284 and 7,077,015 (and also as used in the Luk system cited earlier).

Depicted phone 100 also includes four tilt actuators 118. These actuators are controllably operable to tilt the top, bottom, left and/or right sides of the phone. In one particular embodiment, these actuators have a portion that can protrude out the back casing of the phone, or deform an elastic back portion of the phone—thereby acting against an adjacent body (e.g., the user's hand) to lift the phone from the body. (Actuators 118 are exemplary of a class of so-called "digital clay" arrangements, which controllably deform the volume of an article—here, the phone—in response to associated control signals. U.S. Pat. No. 7,047,143 provides details of another, fluid-based digital clay system.)

Phone 100 also includes two actuators 120. These devices are operable to move a mass along a lengthy linear axis—one extending from side to side across the body of the phone, and the other extending from near the top to near the bottom. The masses may be moved in various ways, such as through magnetic attraction/repulsion, screw drive, etc.

It will be recognized that the provision of plural actuators allows the generation of haptic effects that would not be practical, or possible, with a single actuator. Especially when used in concert, the different actuators can simulate a great diversity of haptic effects. Actuators 120, for example, can be operated so that the phone's center of mass moves in a circle, or ellipse, or any other shape, giving unique sensations to the user. Similarly, the plural actuators 102 can be operated in various sequences (e.g., in order of adjacency, or alternately across the device) to give a variety of effects.

Given the small size of the phone body, and the frequent premium on keeping the device lightweight, the effects of certain of the haptic actuators may be amplified by use of internal suspension arrangements that are made resonant to the frequency of actuator movement—emphasizing their effects. (See, e.g., Immersion's U.S. Pat. No. 7,209,118.)

It will be recognized that the depicted phone is exemplary only, and that particular implementations will almost certainly use different types of actuators in different configurations.

Haptic actuators are responsive to electrical control signals—commonly governed by a programmable processor (often in conjunction with digital-to-analog converter circuitry). While software instructions to control the haptic actuators may be written from scratch, the artisan will most commonly use one of the existing toolkits designed for this purpose. One popular toolkit is the Immersion for Java SDK. This allows control of the actuators through instantiation of Java objects (e.g., JImmWebAPI objects). Immersion also offers a haptic SDK especially for mobile platforms, the TouchSense Mobile Developer SDK. Another haptic toolkit that is popular with some developers is OpenHaptics by SensAble Technologies.

Other Comments

In the detailed embodiments, the haptic actuator may be part of a mobile phone device, or it may be a dedicated and/or separate unit (e.g., audio earbuds equipped with haptic actuators, coupled to a mobile device—either by wire, or wireless, such as Bluetooth).

The human visual and auditory systems have evolved to cope, in various fashions, with multiple simultaneous stimuli, e.g., recognizing words spoken by a friend while also being able to recognize background music, and quickly recognizing multiple objects within a field of view. Our tactile sense is not quite as developed in addressing potential tactile interference/confusion.

In one respect this may be addressed by use of spaced-apart haptic actuators, to which different haptic stimuli are routed. A user's preferred haptic input may be through actuator-equipped earbuds (which also provide audible output). If stimulus is already being applied to the two earbuds (which may be operated independently), new stimulus may be applied to a secondary site, e.g., the soles of the user's feet, by an actuator device conveyed within the user's shoes. (Again, these may be operated independently.) A tertiary site may be an actuator positioned on the bridge of the user's nose, as by eye wear. Next in the priority chain may be an actuator in the user's mobile phone, to which stimulus is routed if other, more-preferred actuators are occupied. Etc.

Instead of applying haptic stimulus to the highest priority actuator that is not already occupied, the stimulus itself can be prioritized, and routed accordingly. If the user's preferred actuator (e.g., earbuds) is providing a signal indicating proximity to social network friends, and a higher-priority haptic signal becomes available (e.g., signaling an incoming phone call from the user's spouse), the higher priority haptic signal may be routed to the preferred actuator, and the signal formerly provided to that actuator may be switched to the next-preferred actuator (e.g., the foot soles).

Instead of spatially distributing the haptic stimuli, they may be temporally distributed. A single actuator may be time-division multiplexed to accommodate different haptic stimuli—rendering one, and then another, and then a third, etc. The interval of time allocated to the various stimulus signals can be varied in accordance with their respective priorities, with higher priority signals allocated more of the actuator's rendering bandwidth. A cycle of actuations can render each stimulus in turn (e.g., 1, 2, 3, 1, 2, 3 . . . ), or higher priority stimuli can be rendered more frequently (e.g., 1, 2, 1, 2, 1, 3, 1, 2, 1, 2, 1, 3 . . . ). The stimuli may also be rendered at amplitudes related to their relative priorities.

Although a given area of skin may not be as adept at dealing with competing stimuli as our visual and auditory senses are, plural different tactile stimuli can nonetheless be sensed simultaneously and distinguished. One example is a constant buzz overlaid with a recurring pulse.

In such embodiments, the amplitudes of the stimuli may be varied in accordance with their priority. If the buzz is the more important signal, it may be strong, and the pulses may be of relatively smaller amplitude. If the pulse signal is the more important, the amplitudes may be reversed.

In some instances, to facilitate distinguishing overlapping stimulus, they may be varied in amplitude in time so as to emphasize, at different instants, different of the stimuli. As an example, the amplitude of one haptic signal may be controlled by a low frequency sine wave, and the amplitude of another may be controlled by a cosine wave of the same frequency. When one is at a maximum, the other is at a minimum. (The absolute value of the sine/cosine signal controls the haptic amplitude.) In other arrangements, the waveforms with which the amplitudes are changed can be different for different haptic signals. One haptic signal may have its amplitude tied to the value of a relatively large sine wave signal; a companion signal may be tied to the value of a smaller triangular waveform that has only a 20% duty cycle (as shown in FIG. 2). More generally, each haptic actuator signal may have its own waveform, frequency, amplitude, and duration, and may have a desired timing relationship (e.g., phase) relative to other such signals.

A user may define preference data allowing customization of the parameters by which haptic signals are rendered. This data can specify, e.g., that a phone call from home is more important than a phone call from work (or vice versa). It may specify that a phone call from home should always be signaled using an actuator in a right ear bud, and signals indicating proximity of friends should preferentially be routed to both feet soles. Likewise, this data can declare the user's preference hierarchy for different actuators. (The preference data may be stored in a user device, in a remote server, a cloud resource, etc.)

Just as popular email programs (e.g., Outlook, Gmail) provide tools allowing detailed rules to be declared that define different treatment of different mail in different circumstances, similar UI constructs can be employed to allow users to declare detailed rules that define different treatment of different haptic stimuli in different circumstances.

Different users may show more or less competence in dealing with tactile stimuli—just as some people are better at reading than others. E-book readers and web browsers often have a mode in which visual text scrolls down the screen at a user-settable rate. Faster readers select a faster rate. In like fashion, haptic arrangements can include a UI control by which users can set default parameters for haptic renderings. If a person is particularly acute at tactile sensation, she may instruct that haptic signals be rendered at 150% of their default speed, or at 75% of their default amplitude. Another person, with callused fingertips, may instruct that haptic signals applied through an actuator glove be applied at twice their default amplitude. Such parameters may also be stored as preference data associated with different users. (Amplitude and speed may be dynamically adapted based on environmental context. For example, if the motion sensors in a smartphone detect that the user is in a haptically noisy environment—as may occur while driving on a rough road—the phone processor controlling the haptic system may increase the amplitude of haptic output signals to help compensate.)

Haptic signatures vary in their appeal, and their effectiveness in gaining user's attention (just as different trademark logos and brand treatments vary in appeal and effectiveness). Given a fixed set of actuators—such as may be found in popular models of smartphones, there is a finite number of haptic signatures (comprising, e.g., different frequencies, amplitudes and durations—the designer's palette) that can be utilized. Certain companies may adopt haptic signatures for use with their goods/services that qualify for trademark protection—due to their distinctiveness, or for copyright protection—as works of creative authorship. But other signatures may not be subject to a claim of exclusive legal rights by one company (just as certain words are not subject to a claim of exclusive legal rights by one company). To allocate use of such haptic signatures, an auction model may be used—akin to that used by Google to trigger presentation of paid advertising when certain search terms are entered on its search page.

In a particular embodiment, a service provider such as Verizon may periodically conduct an auction (using automated, computer-implemented techniques) by which companies can bid for the rights to use particular haptic signatures on certain of Verizon's phones. (The phones may be programmed with a library of stored haptic signature data, corresponding to a variety of popular/effective signatures.) One month, The Coca Cola Company may electronically submit the highest bid, and win rights to trigger a particular haptic signature on all Verizon phones in California (or on all Verizon phones registered to users between 24 and 44 years old, or on the phone of a particular consumer) in response to certain stimuli (e.g., physical proximity to a NFC chip on a carton of Coke, or visual recognition of a Coca Cola product). If, the next month, Federal Express wants rights for that particular haptic signature, it can top Coke's bid, and then use that signature to issue a signal if the phone is within 100 yards of a FedEx/Kinko's storefront (as determined, e.g., by comparing GPS location data from the phone with a data structure identifying locations of such FedEx locations).

When interacting a recognized object or locale (regardless of how it was recognized—visually, by RFID chip, by GPS location, etc.) haptic feedback may be provided to indicate transitory digital information that is crowd-sourced, or made available from existing social networks. For example, when examining a map of a city-wide beer festival intended to be explored by foot, the device may vibrate when another user has reported (e.g., by a geo-referenced blog post or Tweet) a barrier that may exist for the pedestrian (e.g., an un-safe street crossing, similar to the above-mentioned map example). Additionally, the device may provide a haptic signature that indicates (e.g., by amplitude or frequency) the relative popularity of one of the establishments based the number of mobile devices currently inhabiting that location. Similarly, it may haptically indicate the presence of friends with the user's social network at such location, by a distinctive "friend(s) here" signature when that location of the map is sensed (or when the user approaches that physical location in the festival).

Packaging can also involve crowd-source-related, or social network-related, haptic signatures. For example, when a user picks up a bottle of Young's Double Chocolate Stout in the beer aisle of the local grocery (sensed, e.g., visually, or by NFC/RFID chip detection), the user's smartphone may vibrate in approval, with a signature (perhaps reminiscent of clapping, in frequency and amplitude) indicating that this product is popular with one or more of the user's social network friends. (Such information may be gleaned, e.g., from Facebook, which may indicate that one or more Facebook friends clicked a button to indicate they "Like" the product.)

Similarly, a user may be flipping through an issue of Lucky Magazine that highlights various fashion accessories. To peruse the popularity of different items, the user may simply skim their smartphone over the depicted products, capturing imagery. Based on historic click through rates (CTR) or hover time (e.g., logged by the publisher), a probability density function can be calculated and applied to all the accessories on a page. When the device hovers over those items with the most popularity the phone will vibrate more aggressively. Adding accuracy to this behavior can be predictive logic that considers past hover or CTR behavior of that particular user (e.g., by reference to profile data, stored in the phone or at a remote site), or the user's demographic peers or social network friends. Thus, for example, if the user has a demonstrated proclivity for jackets, then the haptic signal normally associated with a jacket depicted in the magazine (due to its public popularity) can be amplified when imaged by the user.

Haptic feedback also provides a mechanism to alert the user to difficult to observe events. One example is a change in the environment, as may be sensed by sensors that post their results publically (e.g., on webpages or databases). A dramatic reduction in barometric pressure may indicate an impending storm. A sudden uptick in winds at higher elevations may be a cue to a wind-surfer that it is time to pack gear and head to the water. Both may cause the user's smartphone to issue a corresponding haptic alert. Digital events may cause this as well, such as moving into and out various wireless hotspots (known or known), the availability of Blue-tooth signals, or proximity to NFC/RFID chips or reader devices. Status information may also be communicated in this way. For example, a mobile device downloading a movie may vibrate at a cadence indicative of the effective bandwidth achieved/rate of download.

Haptics can also be invoked in connection with media consumption. When listening to music, a mobile device or tablet computer may vibrate in accordance with the music's low frequency components (e.g., below 100, 50 or 20 Hz). (Small earbud headphones are unable to create the tactile sense experienced by standing in front of a subwoofer.) For television or movies, a haptic track can be authored and delivered via haptic actuators in a tablet computer in the viewer's lap (even if the user is watching a different screen). For example, in the 30 minute car-chase scene in the movie Bullitt, the tablet can render vibratory sensations emphasizing the stresses and motions the driver is undergoing during the action. In like fashion, when watching a sporting event on a big screen device, a tablet or other mobile device can render tactile stimulus corresponding to the action, e.g., the footsteps of the quarterback as he attempts to get out of the pocket, or a runner running hurdles, or a tennis player serving/returning the ball.

Haptics in general, and 3D varieties in particular (e.g., digital clay), have the ability to impart motion to mobile devices. The motion of a single device can be used to signal information to a user. Consider a phone placed on a desk, which rotates in orientation to indicate the passage of time (e.g., completing a rotation in a minute, an hour, or 12 hours). In another mode, the phone may change its orientation so that its top edge points to the current location of the user's child (as signaled from a GPS sensor, such as a phone, carried by the child) Likewise, the phone may physically reposition itself to point at another nearby device. If two devices are placed near each other, they may choose to move near each other or repel each other as indicated by rules associated with the identity of the objects. In combination with accelerometers, magnetometers and other sensors (camera, microphones), the mobile device can not only impart motion, but accurately understand that it has done so.

FINAL NOTES

Having described and illustrated the principles of my inventive work with reference to illustrative examples, it will be recognized that the technology is not so limited.

For example, while reference has been made to smartphones, it will be recognized that this technology finds utility with all manner of devices—both mobile and fixed. Portable music players, gaming devices, electronic wallets, tablet computers, wearable computers, etc., can all make use of the principles detailed herein.

Particularly contemplated smartphones include the Apple iPhone 4, and smartphones following Google's Android specification (e.g., the Verizon Droid Eris phone, manufactured by HTC Corp., and the Motorola Droid 2 phone). The term "smartphone" (or "cell phone") should be construed to encompass all such devices, even those that are not strictly-speaking cellular, nor telephones.

(Details of the iPhone, including its touch interface, are provided in Apple's published patent application 20080174570. Details of an illustrative cell phone are provided in Nokia's published patent publication 20080267504.)

The design of smartphones and other devices referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc.).

Elements and teachings within the different embodiments disclosed in the present specification are also meant to be exchanged and combined.

The processes and system components detailed in this specification may be implemented as instructions for computing devices, including general purpose processor instructions for a variety of programmable processors, including microprocessors (e.g., the Atom and A4), graphics processing units (GPUs, such as the nVidia Tegra APX 2600), and digital signal processors (e.g., the Texas Instruments TMS320 series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of content signal data may also be distributed among different processor and memory devices. "Cloud" computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. Smartphones and other devices according to certain implementations of the present technology can include software modules for performing the different functions and acts.

Software and hardware configuration data/instructions are commonly stored as instructions in one or more data structures conveyed by tangible media, such as magnetic or optical discs, memory cards, ROM, etc., and may be accessed remotely from across a network. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

While this disclosure has detailed particular ordering of acts and particular combinations of elements, it will be recognized that other contemplated methods may re-order acts (possibly omitting some and adding others), and other contemplated combinations may omit some elements and add others, etc.

As indicated, digital watermarking can be used to identify objects, and extract identifiers from imagery. Such technology is known, e.g., from the assignee's published work in the field, including patent documents U.S. Pat. No. 6,590,996 and 20100150434.

Likewise, fingerprinting can be used to extract an identifier from sensed content (e.g., audio or imagery). A database of reference fingerprints can then be consulted to identify a likely match, to thereby discern the identity of the content. Suitable fingerprinting techniques include SIFT and SURF, disclosed, e.g., in U.S. Pat. No. 6,671,407, and in Bay et al, "SURF: Speeded Up Robust Features," Eur. Conf. on Computer Vision (1), pp. 404-417, 2006; as well as Chen et al, "Efficient Extraction of Robust Image Features on Mobile Devices," Proc. of the 6th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008.

To provide a comprehensive disclosure, while complying with the statutory requirement of conciseness, applicant incorporates-by-reference the patents, patent applications and other documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The invention claimed is:

1. A method comprising:
   with a sensor in a mobile device, capturing identification data transmitted from an RFID chip;
   obtaining additional data that is related to a location of the mobile device, or to a social network;
   obtaining haptic information that is dependent, at least in part, on the identification data and the additional data; and
   presenting the haptic information to a user of the mobile device.

2. The method of claim 1, wherein the mobile device includes a smartphone.

3. The method of claim 1 in which the additional data is related to the location of the mobile device.

4. The method of claim 1 in which the additional data is related to a social network.

5. A method comprising the acts:
   with a sensor in a mobile device, capturing identification data transmitted from a radio frequency transmitter;
   obtaining additional data that is related to a location of the mobile device, or to a social network;
   obtaining haptic information that is dependent, at least in part, on the identification data and the additional data; and
   presenting the haptic information to a user of the mobile device;
   wherein capturing identification data comprises capturing identification data associated with a physical object.

6. The method of claim 5, wherein the physical object is a beverage container.

7. The method of claim 5, wherein capturing the identification data comprises capturing identification data transmitted from a radio frequency transmitter associated with the physical object.

8. The method of claim 7, wherein capturing the identification data comprises capturing identification data transmitted from a radio frequency transmitter of a near field communication chip.

9. A method comprising the acts:
   with a sensor in a mobile device, capturing identification data transmitted from a radio frequency transmitter;
   obtaining additional data that is related to a location of the mobile device, or to a social network;
   obtaining haptic information that is dependent, at least in part, on the identification data and the additional data; and
   presenting the haptic information to a user of the mobile device;
   wherein obtaining the haptic information comprises:
   transmitting at least some of the identification data captured by the sensor to a remote data store; and
   as a consequence of said transmitting, receiving data indicating said haptic information.

10. The method of claim 9, further comprising storing, within a memory of the mobile device, the received data indicating the haptic information.

11. A method comprising the acts:
    with a sensor in a mobile device, capturing identification data transmitted from a radio frequency transmitter;
    obtaining additional data that is related to a location of the mobile device, or to a social network;
    obtaining haptic information that is dependent, at least in part, on the identification data and the additional data; and
    presenting the haptic information to a user of the mobile device;
    wherein the mobile device includes a smartphone, and said act of presenting the haptic information comprises rendering the haptic information from another device equipped with a haptic actuator and spaced apart from the mobile device.

12. The method of claim 11, wherein the other device is coupled to the mobile device via a wireless interface.

13. The method of claim 9, wherein the wireless interface includes Bluetooth.

14. The method of claim 11 in which the additional data is related to the location of the mobile device.

15. The method of claim 11 in which the additional data is related to a social network.

16. A method comprising:
    with a mobile device, capturing location data representing a location of the mobile device;
    from a data store, obtaining a haptic signature associated with the location data; and
    presenting the haptic signature to a user of the mobile device.

17. The method of claim 16, wherein capturing the location data comprises capturing location data using a GPS sensor.

18. The method of claim 16, wherein obtaining the haptic signature comprises:
    transmitting the location data captured by the mobile phone device to a remote data store; and
    in response to said transmitting, receiving data indicating the haptic signature associated with the location data.

19. The method of claim 18, further comprising storing, within a memory of the mobile device, the received data indicating the haptic signature.

20. The method of claim 16, wherein the mobile device includes a smartphone.

21. A method comprising:
    receiving data indicating that a mobile device is within a transmission range of a radio frequency transmitter, said data being emitted by an RFID chip;
    receiving additional information related to a location of the mobile device or to social network information; and
    presenting a haptic signature corresponding to the received data and the additional information to a user of the mobile device.

22. A method using a system including a processor, a memory, and at least one haptic actuator, the method including:
    obtaining first haptic data defining nominal haptic feedback;
    consulting profile data in the memory to obtain haptic customization data corresponding to a particular user; and
    controlling the haptic actuator in a manner responsive to both the first haptic data and also the haptic customization data corresponding to said particular user
    wherein the haptic customization data relates to:
    (a) a speed with which haptic data is to be rendered to said particular user;

(b) a non-zero amplitude with which haptic data is to be rendered to said particular user; or
(c) a body location at which haptic data is to be rendered to said particular user.

23. The method of claim 22, wherein the haptic customization data relates to a speed with which haptic data is to be rendered to said particular user.

24. The method of claim 22, wherein the haptic customization data relates to a body location at which haptic data is to be rendered to said particular user.

25. The method of claim 22, wherein the haptic customization data relates to a non-zero amplitude with which haptic data is to be rendered to said particular user.

* * * * *